Oct. 26, 1926.  
E. W. GRAGERT  
1,604,820  
TRACTION POWER TRANSMISSION MECHANISM  
Filed July 13, 1921  5 Sheets-Sheet 1
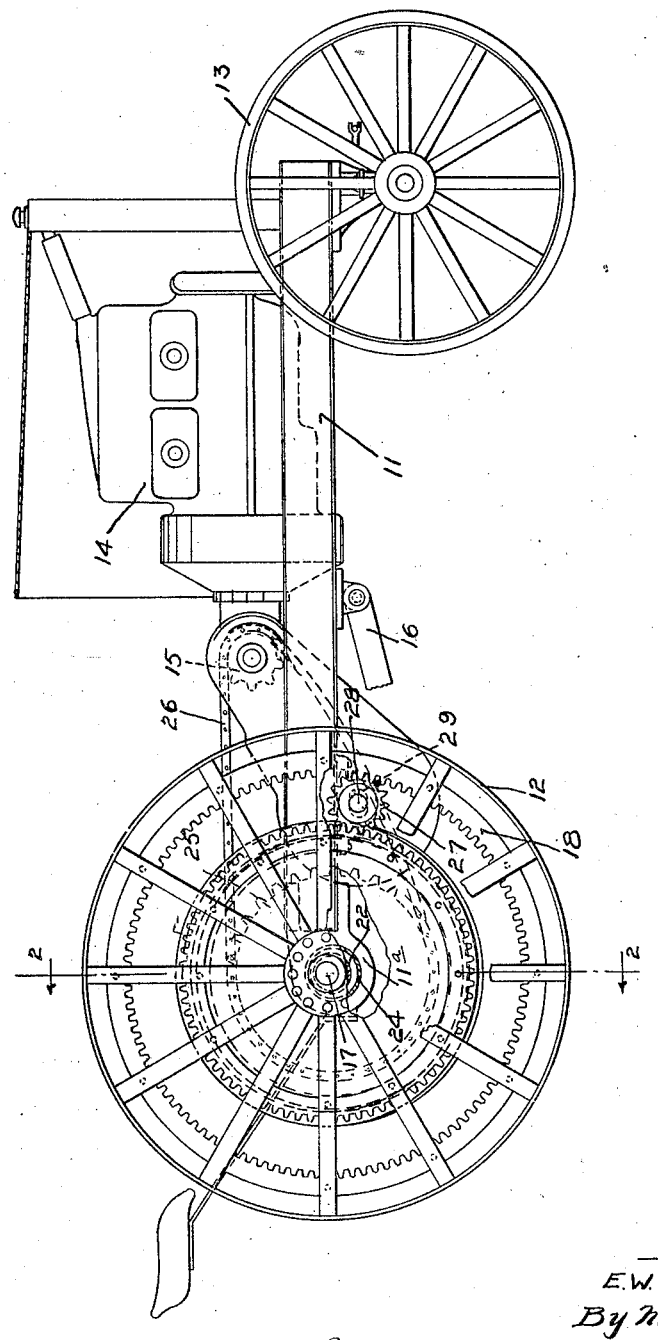
Inventor  
E. W. Gragert  
By his Attorneys Oct. 26, 1926.                                                  1,604,820
                         E. W. GRAGERT
                TRACTION POWER TRANSMISSION MECHANISM
                 Filed July 13, 1921      5 Sheets-Sheet 2
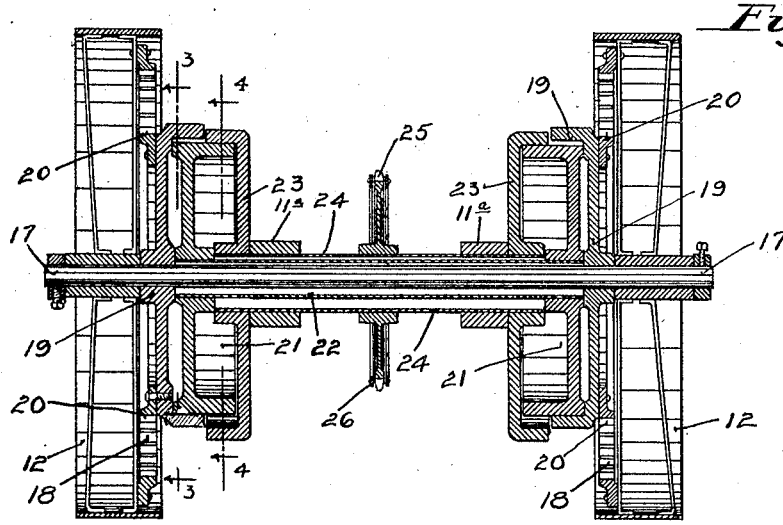
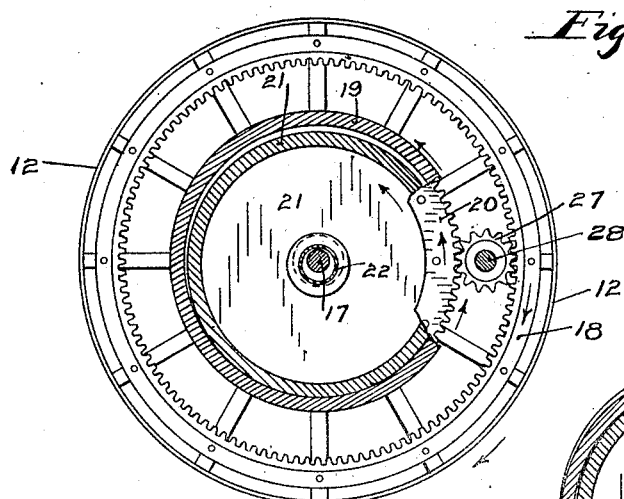
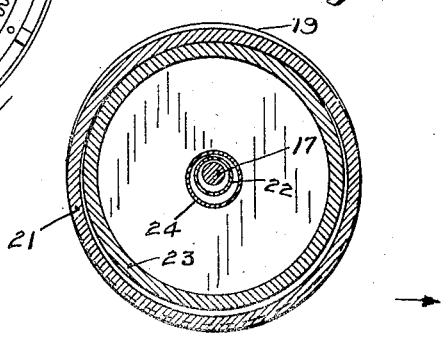
Inventor
E. W. Gragert
By his Attorneys Oct. 26, 1926.

E. W. GRAGERT 1,604,820

TRACTION POWER TRANSMISSION MECHANISM

Filed July 13, 1921     5 Sheets-Sheet 3

Inventor
E. W. Gragert
By his Attorneys

Oct. 26, 1926.                                                              1,604,820
                            E. W. GRAGERT
                TRACTION POWER TRANSMISSION MECHANISM
                    Filed July 13, 1921      5 Sheets-Sheet 4
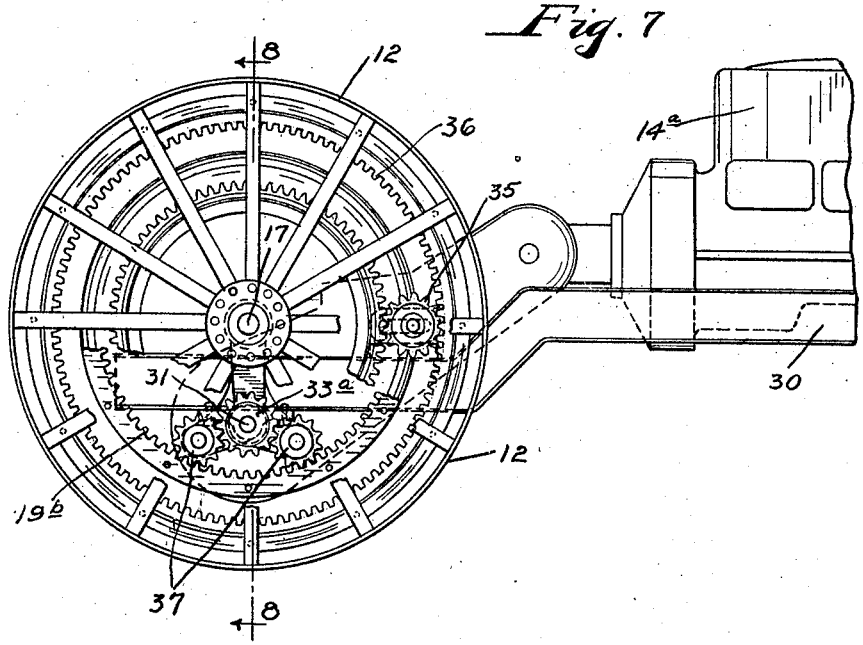
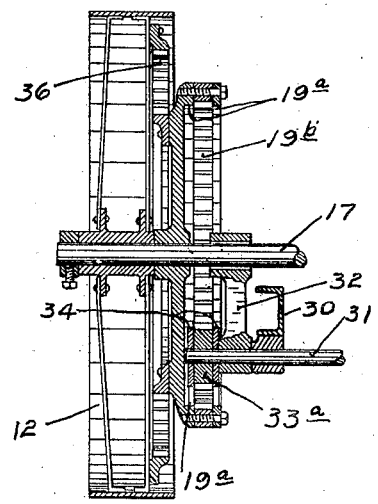
Inventor
E. W. Gragert
By his Attorneys

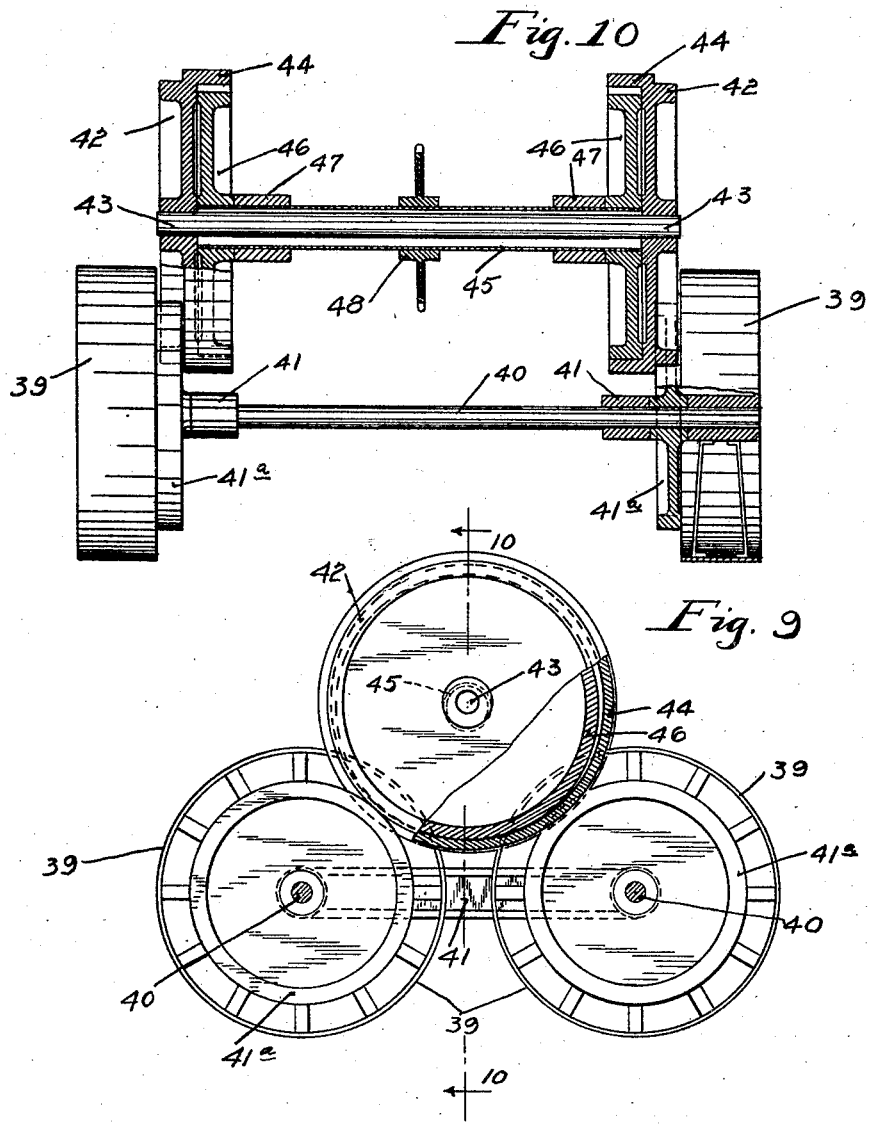

Patented Oct. 26, 1926.

1,604,820

UNITED STATES PATENT OFFICE.

ELMER W. GRAGERT, OF MINNEAPOLIS, MINNESOTA.

TRACTION-POWER-TRANSMISSION MECHANISM.

Application filed July 13, 1921. Serial No. 484,336.

My invention relates broadly to tractors or traction-propelled vehicles and provides a novel transmission mechanism or device consisting of co-operating rolling parts, which, under the drawbar pull or drag, roll backward, lift the load and cause the load, acting therethrough, in part to overcome the drawbar pull or drag. The manner in which this is accomplished will hereinafter more fully appear.

Generally stated, the invention consists of the novel devices and combinations of devices hereinafter described and defined in the claim.

Several forms of the invention are illustrated in the accompanying drawings, wherein like characters indicate like parts throughout the several views.

Referring to the drawings:

Fig. 1 is a side elevation with some parts sectioned and with some parts broken away, illustrating a preferred form of the invention applied to a tractor or motor-propelled vehicle;

Fig. 2 is a transverse vertical section taken on the line 2—2 of Fig. 1;

Fig. 3 is a section taken on the line 3—3 of Fig. 2;

Fig. 4 is a section taken on the line 4—4 of Fig. 2;

Fig. 7 is a view corresponding to Fig. 5, illustrating a still further modified form of the invention;

Fig. 8 is a fragmentary section taken on the line 8—8 of Fig. 7;

Fig. 9 is a view partly in elevation and partly in vertical section illustrating a still further modified form of the invention; and Fig. 10 is a vertical section taken approximately on the line 10—10 of Fig. 9.

Figure 5:
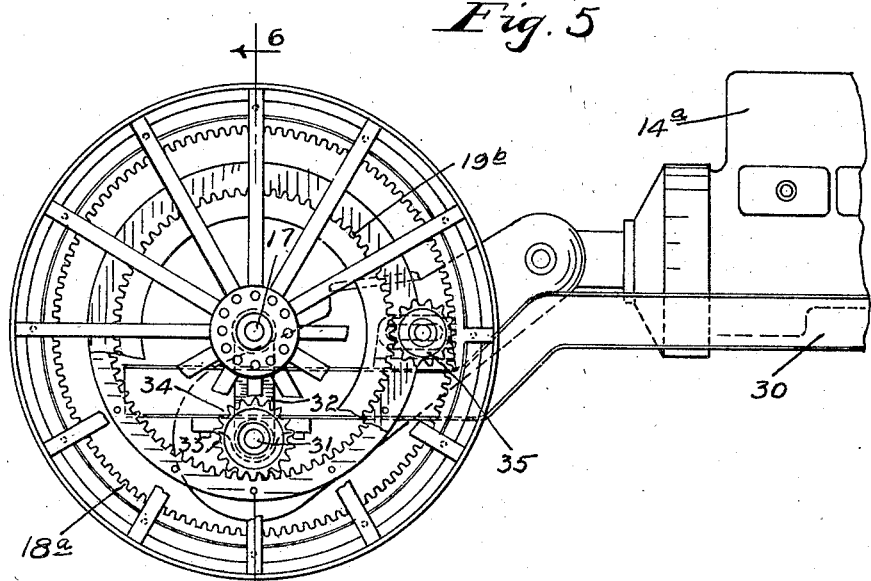
Fig. 5 is a fragmentary side elevation of a tractor illustrating a modified form of the invention, some parts being broken away.

Referring first to the construction illustrated in Figs. 1 to 4, inclusive, the numeral 11 indicates the tractor frame, which is supported at the rear by laterally spaced traction wheels 12 and at the front by suitable steering wheels 13. Mounted on the engine frame 11 is a motor 14, preferably in the form of a multi-cylinder explosive engine, and a crank shaft which is geared or otherwise connected to a driving sprocket 15.

The numeral 16 indicates a drawbar, which is pivoted or otherwise suitably connected to the main frame 11.

The traction wheels 12 are connected to the main frame and are driven from the engine through novel mechanism that constitutes the chief feature of this invention, and which is here illustrated as follows:

The traction wheels 12 are loosely journaled on opposite ends of an axle 17, and are provided with large internal gears 18.

Flanged, so-called internal rollers 19 are loosely journaled on an axle 17 adjacent to the hubs of the traction wheels 12, and are provided with external spur gears 20, as shown of annular form.

Running within the annular flanges of the rollers 19 and projecting outward thereof are external rollers 21, the hubs of which are rigidly attached to a tubular axle 22 that loosely surrounds and never has contact with the central axle 17. These so-called external rollers 21, at the lower portions, rest upon and frictionally engage with the flanges of the internal rollers 19.

The numeral 23 indicates flanged external rollers, the hubs of which are rigidly connected to an outer tubular axle 24 that surrounds but never has contact with the tubular axle 22. The flanges of these rollers 23, at their upper portions, rest upon and have frictional engagement with the tops of the external rollers 21.

It is now important to note that the internal rollers 19 support the external rollers 21 and that said external rollers 21 support the external rollers 23. It is now also important to note that the main frame 11, at its rear end, has bearings 11ª in which the outermost tubular axle 24 is carried and, hence, that the main frame and its load are carried directly on the said axle 24 and that the weight thereof is transmitted to the traction wheels 12 through the rollers 23, 21 and 19.

At its intermediate portion, the outer tubular axle 24 has a sprocket 25 over which and the engine-driven sprocket 15 runs a heavy driving chain 26.

The numeral 27 indicates intermediate spur pinions that mesh with the internal gears 18 of the traction wheels 12 and with the spur gears 20 of the rollers 19 and, hence, transmit a driving power from the drums to said traction wheels.

It should also be noted that the external rollers 21 have materially less diameter than the interiors of the flanges of the co-operating rollers 19 and 23, which permits considerable forward and rearward movements of the traction wheels, axle 17 and drums 19. The gears 18 and 20 will always be held concentric, but to permit the pinions 27 to follow the same in their slight forward and rearward movements, said pinions must be free to float or move slightly forward and rearward with said gears. Hence, said pinions are loosely journaled on the transverse shaft 28, which is free to move slightly in slots 29 formed in bearings on the frame 11, (see Fig. 1).

*Operation.*

The operation of the mechanism above specifically described is substantially as follows:

The power from the engine will be transmitted to the internal rollers 23 through the outermost tubular axle 24 and, in driving the tractor forward, will be rotated in the direction of the arrow marked adjacent thereto on Fig. 3, or, in other words, in an anti-clockwise direction. Under the drawbar pull or drag, the rollers 21 will be caused to run backward and climb upward in the rollers 19, and the rollers 23 will tend to run backward and climb upward on said rising external rollers 21. This will lift or raise the rear end of the main frame and its load, and the weight of the load, acting under gravity, will tend to cause the main frame to lower and move forward. Hence, in action, there is always the weight of the load acting against the drawbar pull and tending to impel the tractor or vehicle forward, thus, to a very great extent, overcoming the drawbar pull or drag.

In the construction just described, the transmission of power through the rollers is by frictional contact, but in other forms, by the use of gear teeth or the like, the transmission of power may be made positive.

In the modified construction illustrated in Fig. 5, the rear traction wheels 12, as before, are loosely journaled on the axle 17, but here the main frame 30 is hung on a jack-shaft 31, which is loosely hung from the axle 17 by arms 32, the upper ends of which surround said axle 17 with considerable play.

Rotatively mounted on the axle 17, adjacent to the hubs of the wheels 12, are internal rollers 19$^a$, which have internal gear teeth 19$^b$. Secured on the ends of the jack shaft 31 are spur pinions 33, that mesh with the internal gear teeth 19$^b$ and have laterally spaced rollers or toothless surfaces 34, which run on the inner surface of the flange of the rollers 19$^a$. The play between the arms 32 and axle 17 permits the weight of the load on the frame 30 to hold the pinions 33—34 engaged with said rollers 19$^a$ as above indicated.

The jack shaft 31 will be suitably driven from the engine 14$^a$ carried on the main frame. Spur pinions 35 mesh with external gears 18$^a$ on the traction wheels. Of course, it should be understood that the pinions 35, like the pinions 27 of the earlier described construction, should be free to move slightly forward and rearward with the co-operating gears 36 and 18$^a$.

With the construction just described, when the tractor or vehicle is driven forward, the pinions 33—34 will tend to climb upward on the lower inner surfaces of the rollers 19$^a$ and, hence, will lift the tractor frame and its load so that, to a very considerable extent, the same advantages are here present as pointed out in connection with the preferred construction earlier described.

Figure 6:
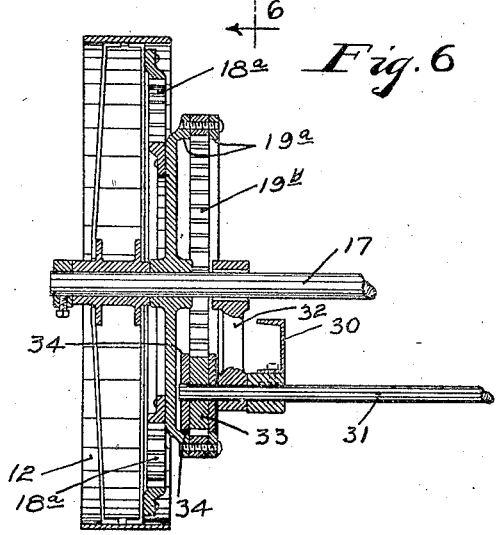
Fig. 6 is a fragmentary transverse section taken on the line 6—6 of Fig. 5.

The construction illustrated in Figs 7 and 8 is like that illustrated in Figs. 5 and 6, with the following exceptions:

The pinions 33$^a$, which are carried by the jack shaft 31, do not here mesh directly with the gear teeth 19$^b$, but mesh with intermediate pinions 37 that are journaled to extensions of the arms 32 and in turn mesh with the internal gears 36 of the traction wheels. In a general way, the operation of this form of the transmission mechanism is like that of the construction illustrated in Figs. 5 and 6.

In the modified form illustrated in Figs. 9 and 10, four traction wheels 39, arranged in laterally spaced pairs, are employed and these are loosely journaled on the ends of axles 40 mounted in a supplemental frame 41 loosely journaled on the axles 40, but secured to rotate with the adjacent traction wheels are external rollers 41$^a$. Riding frictionally on each cylinder pair of rollers 41$^a$ is an external roller 42. These rollers 42 are secured on the ends of axles 43 that are provided on their inner faces with internal roller flanges 44, so that said rollers 42—44 constitute combined external and internal rollers.

Loosely surrounding the axle 43 is a tubular axle 45, to the ends of which are secured external drums 46, which, at their lower portions, bear on the lower portions of the internal drum flanges 44. The main frame of the tractor is not shown, but has bearings 47, (see Fig. 10), in which the tubular axle 45 is journaled. At its intermediate portion, said tubular axle 45 has a sprocket 48, over which a power-driven chain, not shown, will run to transmit power to the traction wheels.

In this last described construction, under the driving force transmitted to the traction wheels through the friction-engaging rollers, the rollers 46 will tend to climb upward on the roller flanges 44 and, hence, will raise the tractor frame and its load with the advantages heretofore pointed out.

From the foregoing description and statements made, it is obvious that this invention is capable of many modifications. It is especially intended for use in connection with tractors or motor-propelled vehicles, but may also be found useful for other purposes.

The term or expression "rollers" is herein used in a broad and liberal sense to include any and all rotary elements or parts that have rolling contact, whether frictional or positive.

What I claim is:

A motor-propelled vehicle with ground-engaging traction wheels, a frame associated therewith, and co-operating rotary power-transmitting means having engaging internal and external cylindrical surfaces through which the driving force and draft strains are transmitted, said means being constructed and arranged to shift their contacting points to a higher elevation and in a direction tending to propel the vehicle forward, subjected to driving and draft strains.

In testimony whereof I affix my signature.

ELMER W. GRAGERT.